US008233752B2

(12) United States Patent
Ide et al.

(10) Patent No.: US 8,233,752 B2
(45) Date of Patent: Jul. 31, 2012

(54) CURVED OPTICAL WAVEGUIDE IN GAP BETWEEN ELECTRODES DEVICE

(75) Inventors: Akiyoshi Ide, West Bloomfield, MI (US); Jungo Kondo, Miyoshi (JP); Osamu Mitomi, Sagamihara (JP); Yasunori Iwasaki, Kitanagoya (JP); Kenji Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 20 days.

(21) Appl. No.: 12/846,076

(22) Filed: Jul. 29, 2010

(65) Prior Publication Data

US 2010/0329601 A1  Dec. 30, 2010

Related U.S. Application Data

(63) Continuation of application No. PCT/JP2009/050498, filed on Jan. 8, 2009.

(30) Foreign Application Priority Data

Jan. 31, 2008  (JP) ................ P2008-020098

(51) Int. Cl.
  *G02F 1/35* (2006.01)
  *G02B 6/42* (2006.01)
  *G02B 6/10* (2006.01)

(52) U.S. Cl. ............... 385/3; 385/32; 385/132

(58) Field of Classification Search .............. 385/2–3, 385/32, 40, 132, 8, 9
See application file for complete search history.

(56) References Cited

U.S. PATENT DOCUMENTS

| 4,818,063 | A | 4/1989 | Takizawa |
| 6,539,130 | B2 * | 3/2003 | Kondo et al. .................. 385/2 |
| 6,721,085 | B2 * | 4/2004 | Sugiyama et al. ............ 359/322 |
| 7,054,512 | B2 * | 5/2006 | Sugiyama et al. .............. 385/9 |
| 7,529,447 | B2 * | 5/2009 | Aoki et al. .................... 385/40 |
| 2002/0126932 | A1 | 9/2002 | Minakata et al. |
| 2002/0191886 | A1 * | 12/2002 | Castoldi et al. ............... 385/14 |
| 2003/0138180 | A1 | 7/2003 | Kondo et al. |
| 2004/0136655 | A1 | 7/2004 | Aoki et al. |
| 2004/0184755 | A1 | 9/2004 | Sugiyama et al. |
| 2004/0247220 | A1 * | 12/2004 | Bosso et al. .................... 385/2 |
| 2004/0264832 | A1 | 12/2004 | Kondo et al. |
| 2005/0185890 | A1 * | 8/2005 | Eldada .......................... 385/45 |
| 2005/0201686 | A1 * | 9/2005 | Cole et al. ..................... 385/40 |
| 2006/0133726 | A1 | 6/2006 | Sugiyama et al. |
| 2007/0081766 | A1 | 4/2007 | Aoki et al. |
| 2007/0104407 | A1 | 5/2007 | Mitomi et al. |
| 2008/0226215 | A1 | 9/2008 | Aoki et al. |

FOREIGN PATENT DOCUMENTS

| JP | 61-210321 | A1 | 9/1986 |
| JP | 2002-169133 | A1 | 6/2002 |
| JP | 2003-215519 | A1 | 7/2003 |
| JP | 2004-219600 | A1 | 8/2004 |
| JP | 2004-287093 | A1 | 10/2004 |
| JP | 2005-331531 | A1 | 12/2005 |
| JP | 2007-133135 | A1 | 5/2007 |
| WO | 2007/058366 | A1 | 5/2007 |

* cited by examiner

*Primary Examiner* — Uyen Chau N Le
*Assistant Examiner* — Michael P Mooney
(74) *Attorney, Agent, or Firm* — Burr & Brown

(57) ABSTRACT

An optical waveguide device includes a substrate of a ferroelectric material, at least a pair of electrodes 4A, 4B provided on one main face of the substrate, and a channel-type optical waveguide 5A formed in a gap 1 of the pair of the electrodes. The optical waveguide 5A has a curved part 15. A central line C of the gap 1 is provided outside of a center line WC of the optical waveguide with respect to the center O of curvature of the curved part 15.

21 Claims, 9 Drawing Sheets

CURVED OPTICAL WAVEGUIDE IN GAP BETWEEN ELECTRODES DEVICE

BACKGROUND OF THE INVENTION

1. Field of the Invention

The present invention relates to an optical waveguide device such as an optical modulator.

2. Background Arts

In Japanese Patent Publication No. 2004-219600A, it is described to reduce the film thickness of a modulating electrode of an optical modulator so that the propagation loss in the electrode can be reduced and the velocity matching can be attained at the same time. This reference describes an X-plate of lithium niobate single crystal as an optical waveguide substrate and an optical waveguide provided in a gap between signal and ground electrodes. The optical waveguide is provided near the signal electrode in an optical modulating region modulating light by applying a voltage.

According to Japanese Patent Publication No. 2005-331531A, the widths of the gaps of the signal and ground electrodes are changed between voltage applying and feed-through regions. It is thereby possible to prevent ripples in the radio frequency pass characteristics (S21) of the electrodes.

Further, according to Japanese Patent Publication No. 2007-133135A, the radius of curvature of a curved part of a Mach-Zender type optical waveguide is made 30 mm or smaller so as to reduce the radiation loss in the curved part.

Further, according to Japanese Patent Publication No. 2002-169133A, the applicant discloses the method of reducing the product VπL of half value voltage and electrode length by approaching the optical waveguide to the central electrode.

Besides, according to WO2007/058366A1, the applicant discloses a folded-back type optical modulator having a specific structure.

Further, according to Japanese Patent Publication No. 2003-215519A, the applicant discloses the technique of attaining the velocity matching required for the operation at radio frequency by thinning an optical waveguide substrate.

SUMMARY OF THE INVENTION

The electrode gap between the signal and ground electrodes is preferably narrower for reducing the driving voltage. Specifically, the inventors have studied that, in a Mach-Zehnder type optical waveguide, the electrodes are provided in both sides of the curve part of the optical waveguide, as well as both sides of the optical modulating region for modulating the propagating light by applying a voltage thereon. During the study, however, as the electrode gap becomes smaller, optical absorption in the electrodes and the propagation loss of light are proved to be considerably increased.

The applicant disclosed, in Japanese Patent Publication No. 2003-215519A, the technique of thinning an optical waveguide substrate to attain the velocity matching required for the operation at radio frequency. By thinning the optical waveguide substrate as described above, the velocity and impedance matching can be attained and the operation at high velocity can be realized. Since the thickness of the substrate in the region of the optical waveguide formed becomes small, however, the spot pattern of the propagation mode in the optical waveguide is widened laterally (in the direction of the gap). As the optical waveguide is thinned, the propagation loss of light is considerably increased. Specifically, the velocity matching can be realized without forming an $SiO_2$ buffer layer by thinning the substrate. Since $SiO_2$ is transparent with respect to the modulated light, the absorption of light by the electrodes is considerable in the case that the $SiO_2$ buffer layer is not formed.

It is possible to reduce the propagation loss of light by providing the $SiO_2$ buffer. When the $SiO_2$ buffer is provided, however, DC drift may be induced in which the operating point is shifted. Specifically, it is difficult to provide the $SiO_2$ buffer layer in the DC electrodes on the viewpoint of the stability of operation.

An object of the present invention is to provide an optical waveguide device having a channel-type optical waveguide, in which the optical absorption loss by an electrode in a curved part of the optical waveguide can be reduced and the size of the electrode gap can thereby be lowered.

The invention provides an optical waveguide device comprising a substrate comprising main faces, at least a pair of electrodes provided on one main face of the substrate, and a channel-type optical waveguide formed in a gap of the pair of the electrodes. The optical waveguide has a curved part, and the central line of the gap is provided outside of the center line of the optical waveguide with respect to the center of curvature of the curved part.

The effects of the present invention will be described referring to FIGS. 1 and 2.

In a plan view of FIG. 1, a gap 1 is formed between a pair of electrodes 4A (4C) and 4B. A curved part 15 of an optical waveguide 5A (5B) is provided in the gap. The curved part 15 has a center O of curvature and a radius R of curvature. 8 represents the normal line to the curved part 15. The gap 1 is also curved as the curved part 15.

10 and 9 represent borderlines of the electrodes 4A (4C) and 4B with respect to the gap 1, respectively. According to the present invention, the center line C of the gap 1 is provided outside of the centerline WC of the curved part 15 of the optical waveguide 5A (5B) with respect to the center of curvature O. That is, the optical waveguide is provided at a position shifted toward the inside of the center line C of the gap. It is thereby found that the optical propagation loss due to the optical absorption loss into the electrodes is considerably reduced. Further, even when the size "G" of the gap 1 is lowered to reduce the electrode loss, it is possible to reduce the optical propagation loss due to the absorption of light by the electrodes.

The reasons would be considered as follows.

For example, according to Japanese Patent Publications 2004-219600A, 2005-331531A and 2007-133135A and WO 2007/058355A1, an optical waveguide is formed along a straight line in a voltage application region of an optical modulator, so that the peak of intensity distribution of light propagating through the optical waveguide is positioned substantially along the center of the waveguide. Therefore, when the optical waveguide is provided near the signal electrode in the voltage applying region as described in WO 2007/058366A1, the absorption of light by the signal electrode may be enhanced.

Besides, for example as schematically shown in a plan view of FIG. 2, when light propagates through a curved part 15 of an optical waveguide, the peak of effective optical intensity distribution is observed at a position shifted toward the outer edge 15a with respect to the center line of the curved part 15 and not observed at a position shifted toward the inner edge 15b. That is, the peak of optical intensity distribution of the propagating light is present outside of the geometrical center line WC of the optical waveguide. It is thus considered that the absorption of light into the electrode 4A (4C) provided outside of the curved part is enhanced to increase the propagating loss of light.

Based on the discovery, the inventors shifted the center line C of the electrode gap toward the outside of the geometrical center line WC of the optical waveguide. The absorption of propagating light into the electrodes 4A (4C) and 4B can be thereby successfully minimized to reduce the propagating loss of light. As a result, the size G of the electrode gap can be lowered to reduce the electrode loss and the absorption loss of light by the electrodes can be prevented at the same time.

DETAILED DESCRIPTION OF THE INVENTION

According to a preferred embodiment, a plurality of curved parts are provided in an optical waveguide, and an inflection point is provided between the adjacent curved parts in the optical waveguide. In this case, the present invention may be applied to each of the curved parts.

Figure 3:
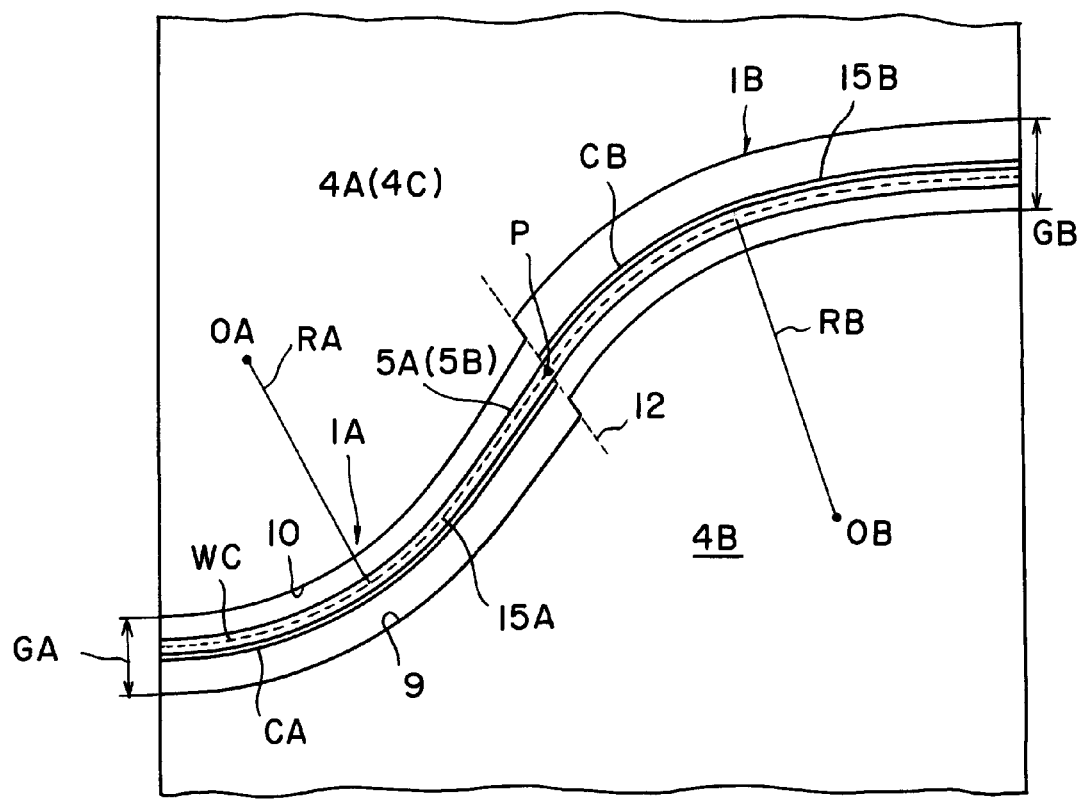
FIG. 3 is a plan view schematically showing an example in which the present invention is applied to a plurality of curved parts.

FIG. 3 is a plan view illustrating this embodiment. According the embodiment, a gap 1A or 1B is formed between a pair of electrodes 4A (4C) and 4B. 12 represents a border line of each of the gaps 1A and 1B. A curved part 15A of an optical waveguide 5A (5B) is provided in the gap 1A, and a curved part 15B of the optical waveguide is provided in the gap 1B.

OA represents a center of curvature and RA represents a radius of curvature of the curved part 15A. OB represents a center of curvature and RB represents a radius of curvature of the curved part 15B. The gap 1A is curved similarly as the curved part 15A, and the gap 1B is curved similarly as the curved part 15B. The centers OA and OB of curvature are positioned in the opposite sides of the gaps. As a result, an inflection point P is positioned on the boundary line of the curved parts 15A and 15B.

10 and 9 represent the edges of the electrodes 4A (4C) and 4B, respectively, facing the gap. In the curved part 15A, the center line CA of the gap 1A is provided outside of the center line WC of the optical waveguide 5A (5B) with respect to the center OA of curvature. That is, the optical waveguide is provided at a position offset towards the inside of the center line CA of the gap. Further, In in the curved part 15B, the center line CB of the gap 1B is provided outside of the center line WC of the optical waveguide 5A (5B) with respect to the center OB of curvature. That is, the optical waveguide is provided at a position offset towards the inside of the center line CB of the gap.

Besides, according to the example of FIG. 3, the present invention is applied to the gaps 1A and 1B including the boundary 12. However, an intermediate region may be formed between the gaps 1A and 1B where the present invention is not applied.

The center lines C, CA and CB of the electrode gaps 1, 1A and 1B mean lines connecting center points of the edge 10 of the electrode 4A (4C) and the edge 9 of the electrode 4B opposing each other through the gap, respectively.

The center line of the optical waveguide means a line connecting points having the maximum refractive index in the waveguide in a plan view. Specifically, the center line is decided as follows.

(1) In the case that the optical waveguide is a diffusion type optical waveguide produced by the diffusion of a metal film used for forming the waveguide, it is assigned the center line of the metal film.

(2) In the case that the optical waveguide is a ridge type optical waveguide, it is assigned the center line of an upper face of the ridge type waveguide.

Distances "d" of the center lines C, CA and CB of the gap and the center line WC of the optical waveguide may preferably be 0.1 μm or larger and more preferably be 0.5 μm or larger, respectively, on the viewpoint of reducing the loss due to absorption of the propagating light into the electrodes. It is thus possible to increase the offset amount with respect to the shift of the optical distribution as described above, so that the effects of the present invention is more considerable.

Further, if "d" is too large, the gap widths G, GA and GB become larger with respect to the width of the optical waveguide, so that the electrode loss is increased. Alternatively, in the case that the same gap width would be assigned, it would mean that the center line WC of the optical waveguide approaches the inside electrode, so that the loss due to the optical absorption into the electrode becomes large. On the viewpoint of the present invention, "d" may thus preferably be 5 μm or smaller and more preferably be 3 μm or smaller.

The sizes "G", "GA" and "GB" of the electrode gaps may preferably be 40 μm or smaller and more preferably be 30 μm or smaller, on the viewpoint of reducing the driving voltage. Further, when "G", "GA" and "GB" are too small, the propagation loss of light due to the absorption of light into the electrodes becomes large. On the viewpoint, "G", "GA" and "GB" may preferably be 5 μm or larger and more preferably be 8 μm or larger.

Although the optical waveguide device of the present invention may most preferably be an optical intensity modulator or an optical phase modulator, it may be the other kinds of optical waveguide devices such as a high-order harmonic wave generating device, optical switch, optical signal processor and a censor device.

The present invention may be applied to a so-called coplanar waveguide type electrode (CPW electrode) configuration. According to the coplanar type, a line of signal electrode is provided between a pair of ground electrodes.

Further, the present invention may be applied to a traveling wave type optical modulator of independent modulation type. Still further, the optical may be an optical intensity modulator or phase modulator. In the case that a plurality of phase modulating parts are used, the phase modulating system is not particularly limited, and includes various phase modulation systems such as DQPSK (Differential Quadrature Phase Shift Keying), SSB (Single Side Band Amplitude Modulation) and DPSK (Differential Phase Shift Keying). The modulation systems themselves are known.

Figure 4:
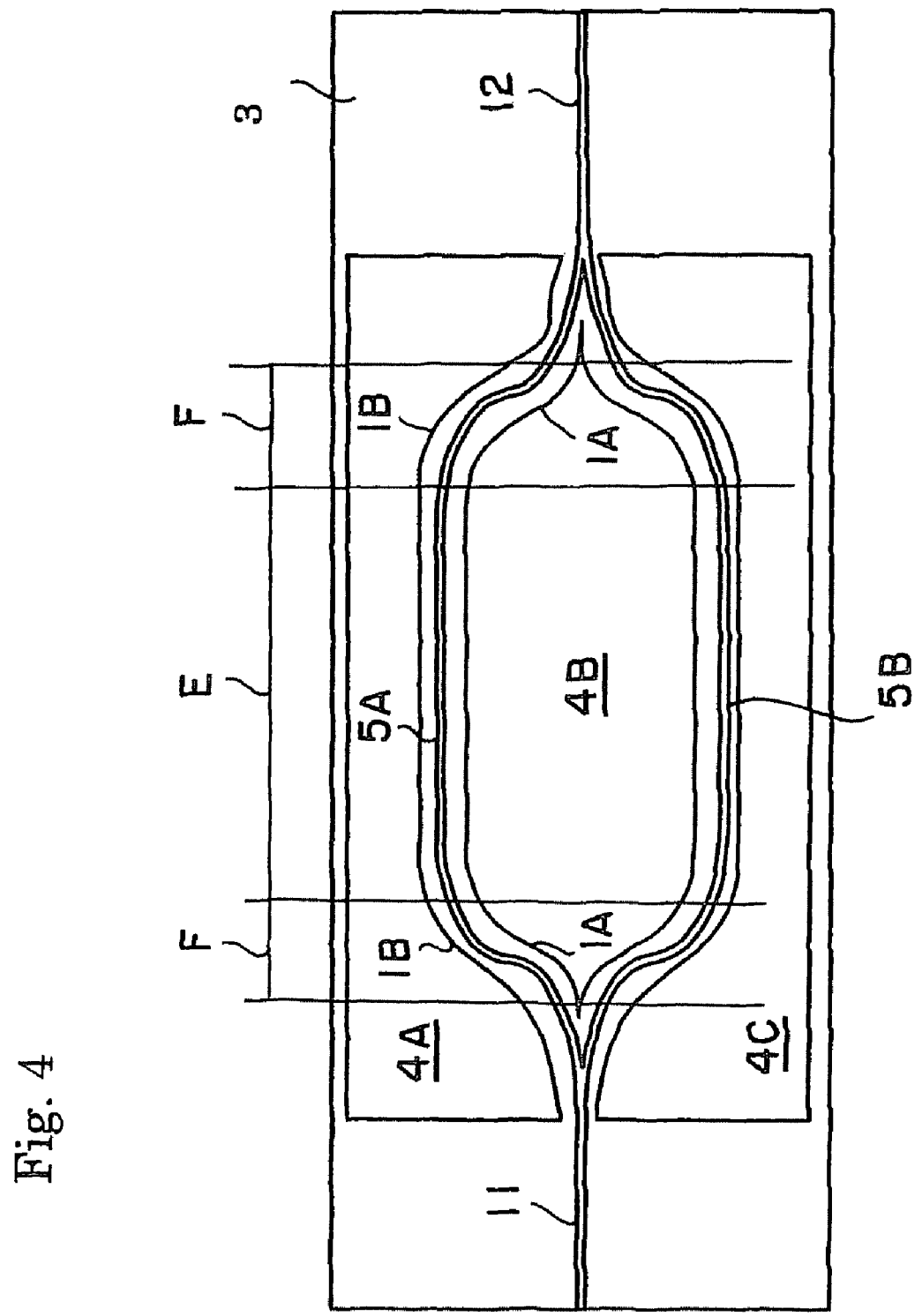
FIG. 4 is a plan view showing an optical modulator to which the present invention is applicable.

FIG. 4 is a plan view schematically showing an optical modulator according to one embodiment of the present invention.

According to the example, an optical waveguide includes an incident part 11, branched parts and an emitting part 12 to form an optical waveguide of Mach-Zehnder type in a plan view. That is, light beam is incident into the incident part 11 of the optical waveguide and divided into the two branched parts. The light beams then propagate through the respective curved regions F into the respective modulating regions E. The light beams then propagate through the curved regions F, are multiplexed and then emitted from the emitting part 12. In the modulating regions E, a signal voltage is applied onto each of the branched optical waveguides 5A and 5B substantially in a horizontal direction. The present invention is applied to the gaps 1A and 1B in each curved region F.

Figure 5:
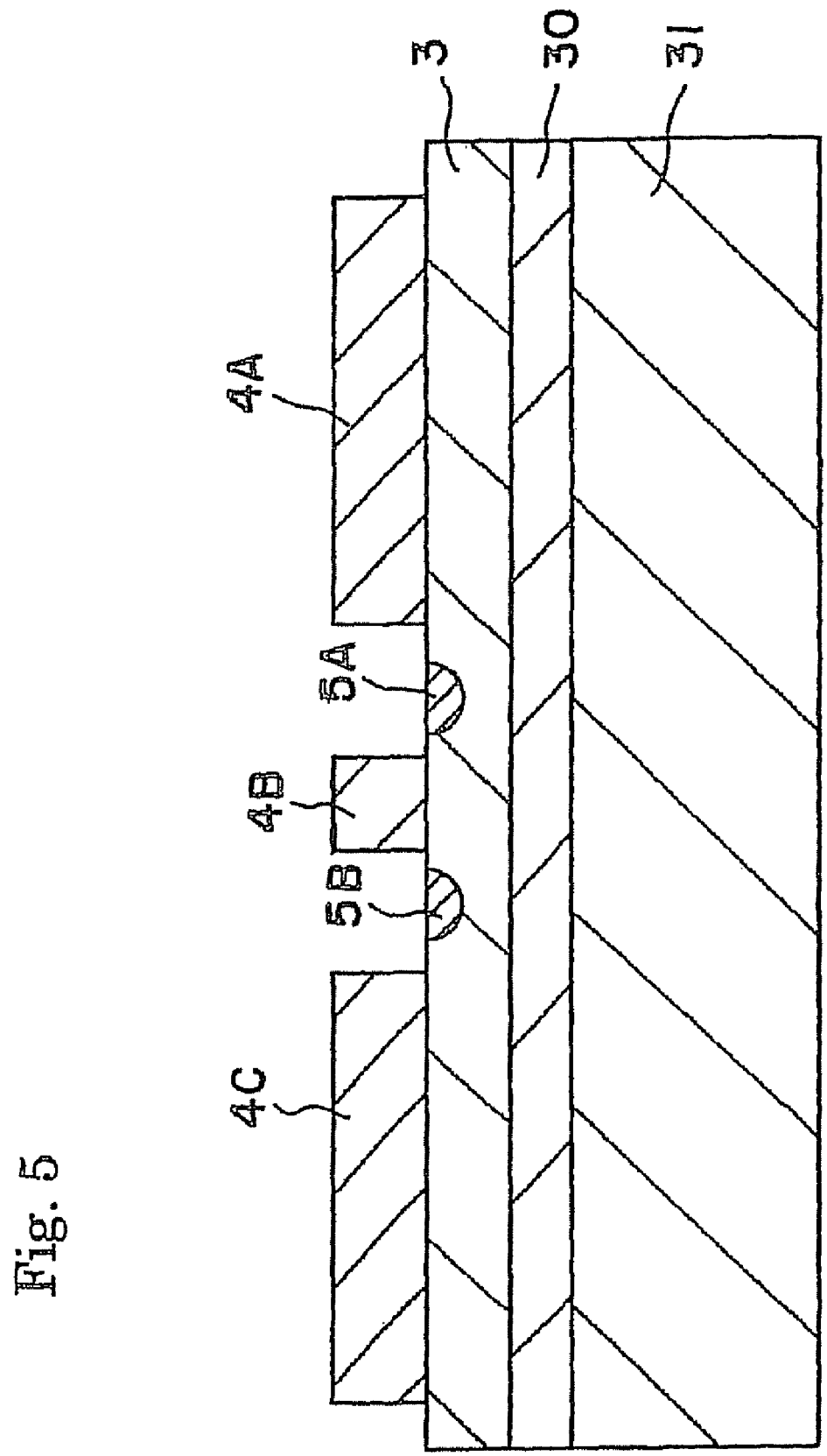
FIG. 5 is a horizontal cross sectional view showing the optical modulator shown in FIG. 4.

Preferably, as shown in FIG. 5, an adhesive layer 30 having a substantially constant thickness is provided between the lower face of an optical waveguide substrate 3 and a supporting body 31, so that the adhesive layer adheres the substrate 3 and the supporting body 31.

Figure 6:
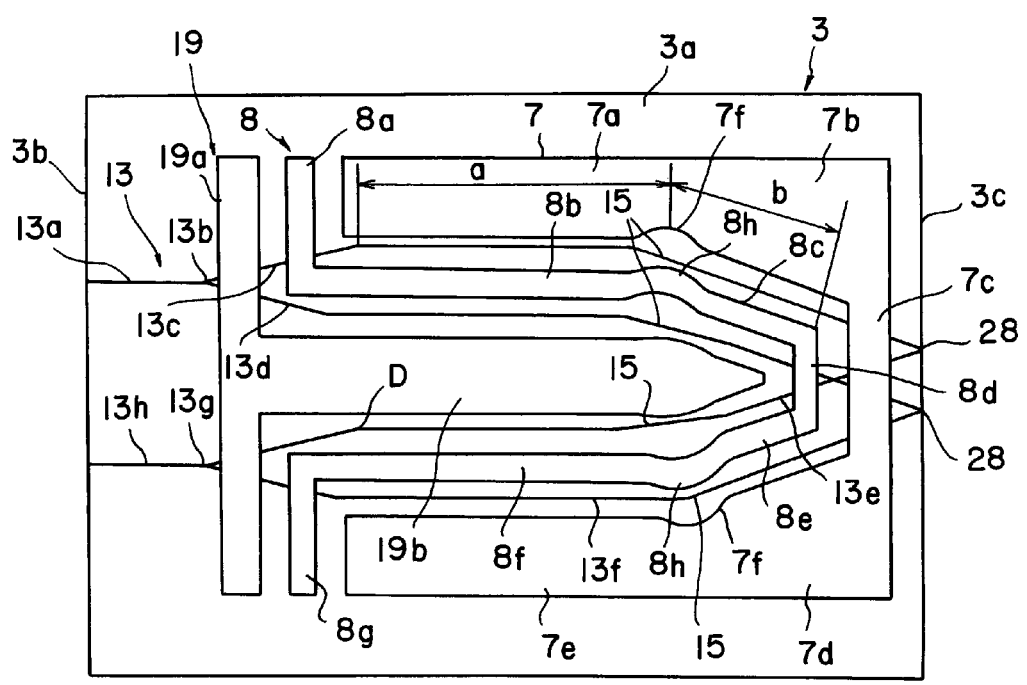
FIG. 6 is a plan view showing an optical modulator according to another embodiment of the present invention.
Figure 7:
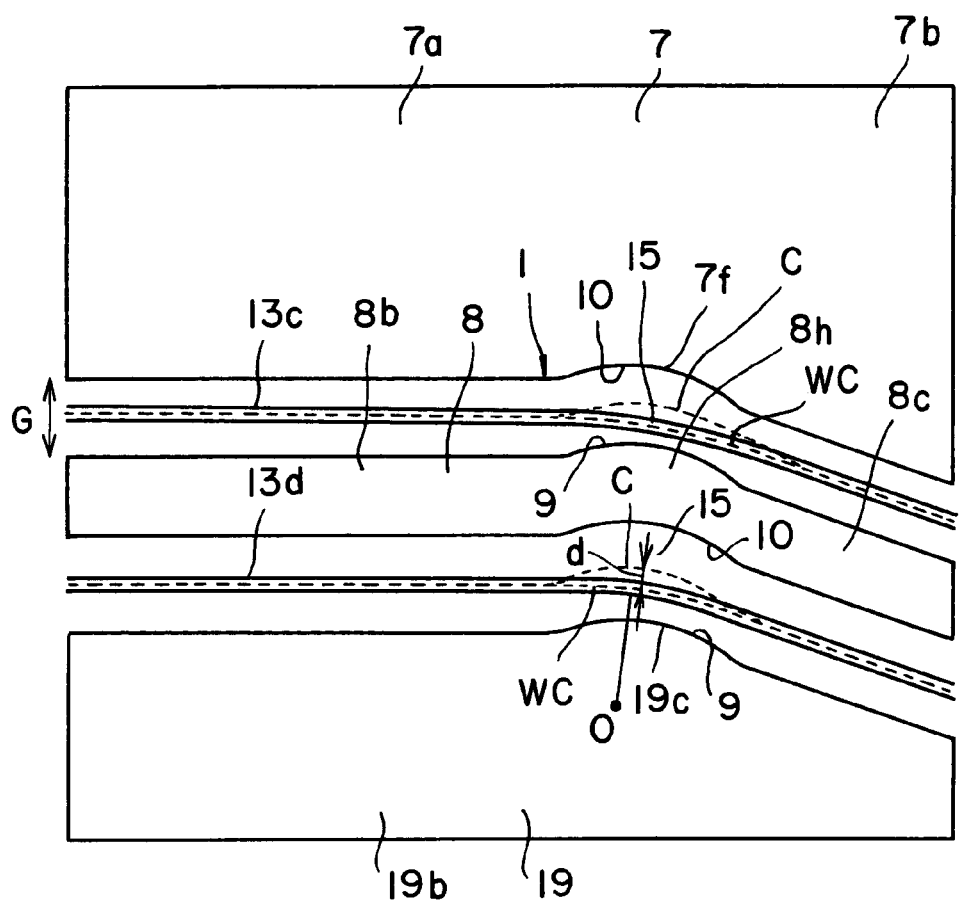
FIG. 7 is an enlarged view showing a curved part of the optical modulator of FIG. 6.

FIG. 6 shows an example in which the present invention is applied to a folding-back part of a folding-back type optical modulator described in WO 2007/058366 A1. FIG. 7 shows an enlarged view of the curved part of the folding-back part of an optical waveguide.

The optical waveguide device of FIG. 6 has a substrate main body 3. As shown in FIG. 5, the main body 3 is adhered to the supporting body 31 through the adhering layer 30. Although the main body 3 has a shape of a flat plate according to the present example, the shape is not limited to a flat plate.

Predetermined ground electrodes 7 and 19 and a signal electrode 8 are formed on a first main face 3a of the substrate main body 3. Although a so-called coplanar waveguide type electrode (CPW electrode) configuration is applied according to the present example, the electrode configuration is not particularly limited. According to the present example, optical waveguides are formed in gaps between the adjacent signal and ground electrodes, respectively, so that a signal voltage is applied onto each waveguide substantially in a horizontal direction.

Light beam is incident into an end part 13a of an optical waveguide 13, divided at a dividing point 13b to propagate in branched waveguides 13c, 13d, and then subjected to modulation with electrodes 7, 8 and 19. After the light beams propagate through the branched waveguides 13c and 13d and curved parts 15, the light beams are then reflected at respective folding points 28. The light beams then propagate through second folded parts, curved parts 15 and respective branched waveguides 13e and 13f. The light beams are then multiplexed at a multiplexing point 13g and emitted from an emitting part 13h.

An inside ground electrode 19 includes a feeding part 19a connected to a feed through not shown and a series of electrode part 19b extending in a direction parallel with an interacting part of the branched optical waveguides. An outer ground electrode 7 includes a connecting portion 7 provided over the optical waveguide, electrode parts 7b, 7e extending from the respective sides of the interacting part 7e and electrode parts 7a, 7e extending in a direction parallel with the interacting part from the electrode parts 7b, 7d, respectively. The signal electrode 8 includes a pair of feeding parts 8a, 8g, electrode parts 8b, 8f extending in a direction parallel with the main parts from the feeding parts 8a, 8g, respectively, electrode parts 8c, 8e extending from the electrode parts 8b, 8f, respectively, and a connecting part 8d connecting the electrode parts 8c and 8e.

FIG. 7 is an enlarged view showing the curved part of the optical waveguide.

Gaps 1 are formed between the ground electrode 7 and the signal electrode 8 and between the ground electrode 19 and the signal electrode 8, respectively. The branched optical waveguide is provided in each gap. The present invention is applied to each curved part 15 of each optical waveguide.

9 and 10 represent the edges of the electrodes, respectively, facing the gap 1. The center line WC of each optical waveguide and the center line C of the gap overlap in regions out of the curved part. In the curved part, however, the center line C of the gap 1 is provided outside of the center line WC of the optical waveguide with respect to the center O of curvature of the optical waveguide. That is, the optical waveguide is provided at a position offset towards the inside of the center line C of the gap. It is thus found that the optical propagation loss due to the optical absorption into the electrode can be considerably reduced. Further, particularly when the dimension G of the gap 1 is lowered to reduce the electrode loss, it is possible to reduce the optical propagation loss due to the absorption of light into the electrode.

Besides, curved parts 7f, 8h and 19c are provided to provide the off-set structure.

The present invention is applicable to various kinds of electrodes such as DC (direct current) biasing electrode, phase modulation electrode or the like, as well as the radio frequency electrode.

Figure 8:
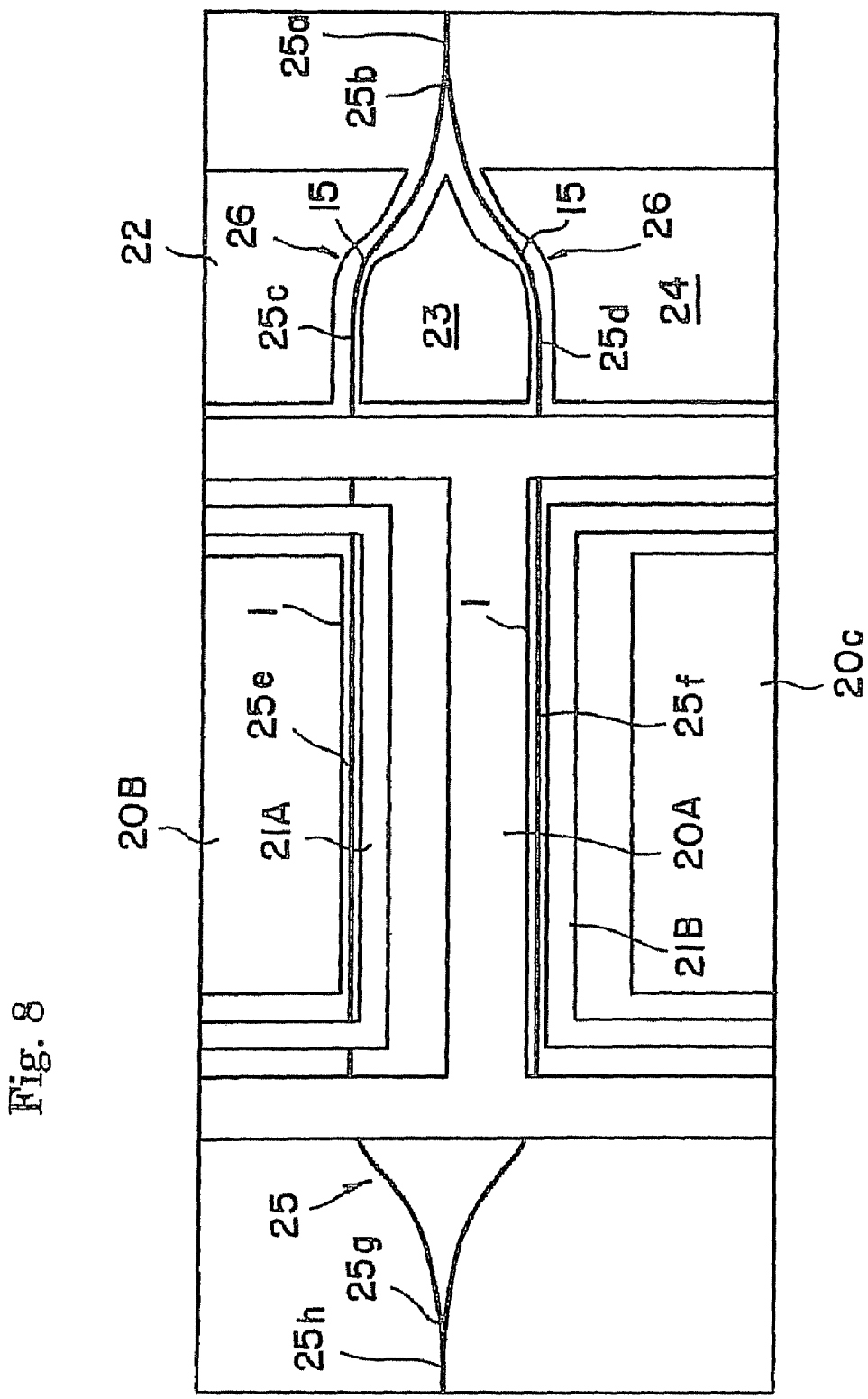
FIG. 8 is a plan view showing an optical modulator according to still another embodiment of the present invention, in which the present invention is applied to DC biasing electrodes.

FIG. 8 shows an example in which the present invention is applied to a DC bias electrode of a dual drive type optical modulator using an unsymmetrical CPW electrode configuration.

According to the example, ground electrodes 20B, 20C and a central ground electrode 20A are formed on a substrate. A radio frequency signal electrode 21A is formed between the ground electrodes 20B and 20C, and a radio frequency electrode 21B is formed between the ground electrodes 20C and 20A.

Further, a DC biasing electrode is provided according to the present invention. That is, ground electrodes 22, 24 and a signal electrode 23 for DC bias are provided. Gaps 26 are provided between the ground electrode 22 and signal electrode 23 and between the ground electrode 24 and signal electrode 23, respectively.

The optical waveguide 25 includes an incident part 25a, branched parts 25b, DC bias application parts 25c, 25d, interacting parts 25e, 25f, a multiplexing part 25g and an emitting part 25h. The DC bias application parts 25c and 25d are provided in gaps 26 of the DC biasing electrodes, respectively. The interacting parts 25e and 25f are provided in the gaps 1 of the radio frequency electrodes, respectively.

Figure 9:
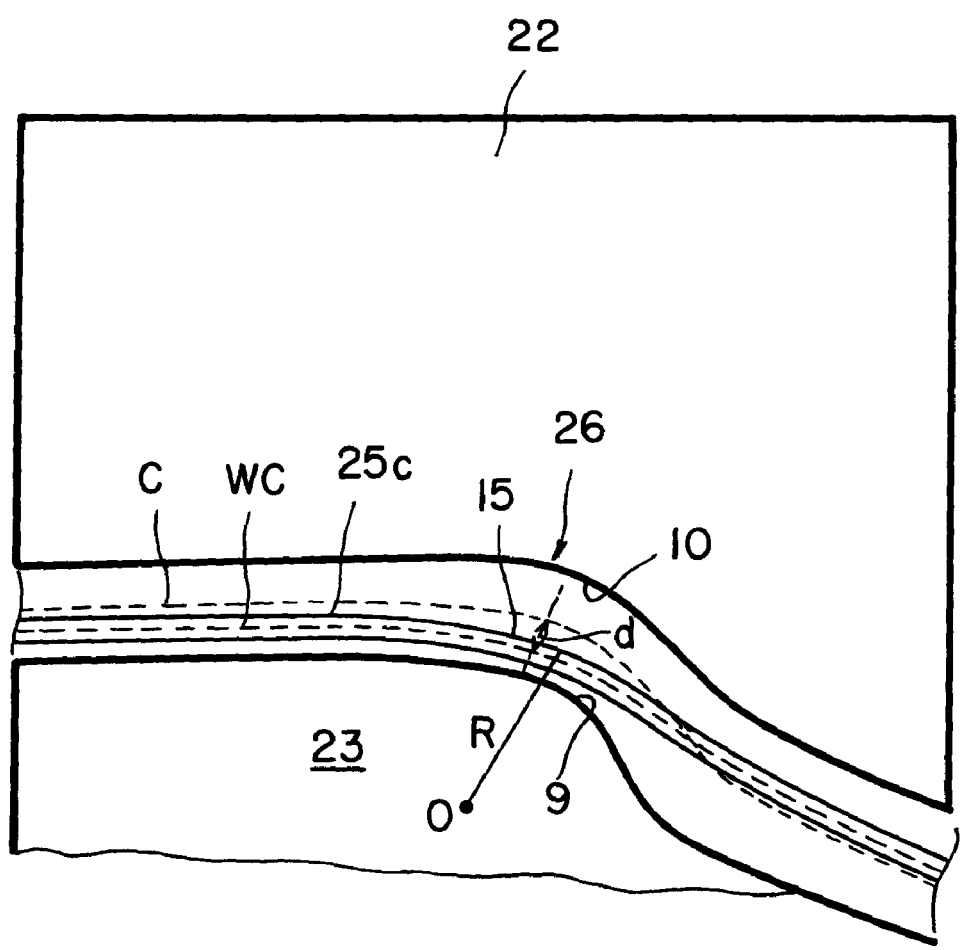
FIG. 9 shows an example where the present invention is applied to a curved part of a gap of the DC biasing electrodes shown in FIG. 8.

The present invention is applied to each curved part of each of the optical waveguides 25c and 25d. That is, as shown in FIG. 9, "O" and "R" represent the center of curvature and radius of curvature of the curved part 15 of the optical waveguide, respectively. The gap 26 is curved along the curved part 15. The center "O" of curvature is positioned inside of the curved part of the gap.

10 and 9 represent the edges of the electrodes 22 and 23, respectively, facing the gap. In the curved part 15, the center line C of the gap is provided outside of the center line WC of the optical waveguide with respect to the center O of curvature. That is, the optical waveguide is provided at a position offset toward inside of the center line C of the gap.

The optical waveguide may be a ridge type optical waveguide directly formed on one main face of the substrate, or a ridge type optical waveguide formed on another layer on the one main face of the substrate. Alternatively, the optical waveguide may be an optical waveguide formed by inner diffusion process such as titanium or zinc diffusion process, or an optical waveguide produced by ion exchange process such as proton exchange.

Specifically, the optical waveguide may be a ridge type optical waveguide protruding from the surface of the substrate. The ridge-type optical waveguide can be formed by laser or machining. Alternatively, a film of a high refractive index may be formed on the substrate and the film of the high refractive index may be subjected to machining or laser ablation to form a ridge-type channel optical waveguide. The film of a high refractive index may be formed by, for example, chemical vapor deposition, physical vapor deposition, metal organic chemical vapor deposition, sputtering or liquid phase epitaxial method.

Although the electrodes are formed on the surface of the substrate according to the above examples, the electrodes may be directly formed on the one main face of the substrate, or may be formed on a buffer layer on the main face of the substrate. The buffer layer may be made of a known material such as silicon oxide, magnesium fluoride, silicon nitride or alumina. The term "low dielectric layer" means a layer composed of a material having a dielectric constant lower than that of a material forming the substrate.

According to a preferred embodiment, at least in the curved part, the electrode is provided directly on the substrate without interposing the buffer layer.

That is, when the thickness of the substrate is 20 μm or smaller, it is possible to attain velocity matching without forming the buffer layer thereon. Particularly, it is difficult to provide the $SiO_2$ buffer layer on the DC electrode on the viewpoint of stable operation. When the $SiO_2$ buffer layer is not formed, however, the optical absorption due to the electrode tends to be more considerable.

The present invention is useful for reducing the optical absorption in the curved part and thus particularly advantageous on the viewpoint.

The thickness of the adhesive layer 30 may preferably be 1000 μm or smaller, more preferably be 300 μm or smaller and most preferably be 100 μm or smaller. Further, although the lower limit of the thickness of the adhesive layer 30 is not particularly limited, it may be 10 μm or larger on the viewpoint of reducing the refractive index of microwave.

The optical waveguide substrate 3 and supporting body 31 are made of an electro-optic material having ferroelectricity and may preferably be made of a single crystal. Such crystal is not particularly limited as far as it is effective for light modulation, and includes lithium niobate, lithium tantalate, lithium niobate-lithium tantalate solid solution, potassium lithium niobate, KTP and quartz.

The material of the supporting body 31 may be a glass such as quartz glass, in addition to the electro-optic materials described above.

The kind of the adhesive 30 is not particularly limited as far as it satisfies the aforementioned conditions. The adhesive includes an epoxy resin adhesive, a thermal setting resin type adhesive, an ultraviolet curable resin adhesive, and a ceramic adhesive having a thermal expansion coefficient near that of the electro-optic material such as lithium niobate, for example "ALON CERAMICS C" (manufactured by Toa Gosei Co., Ltd.: a thermal expansion coefficient of $13 \times 10^{-6}$/K).

EXAMPLES

Experiment 1

Figure 1:
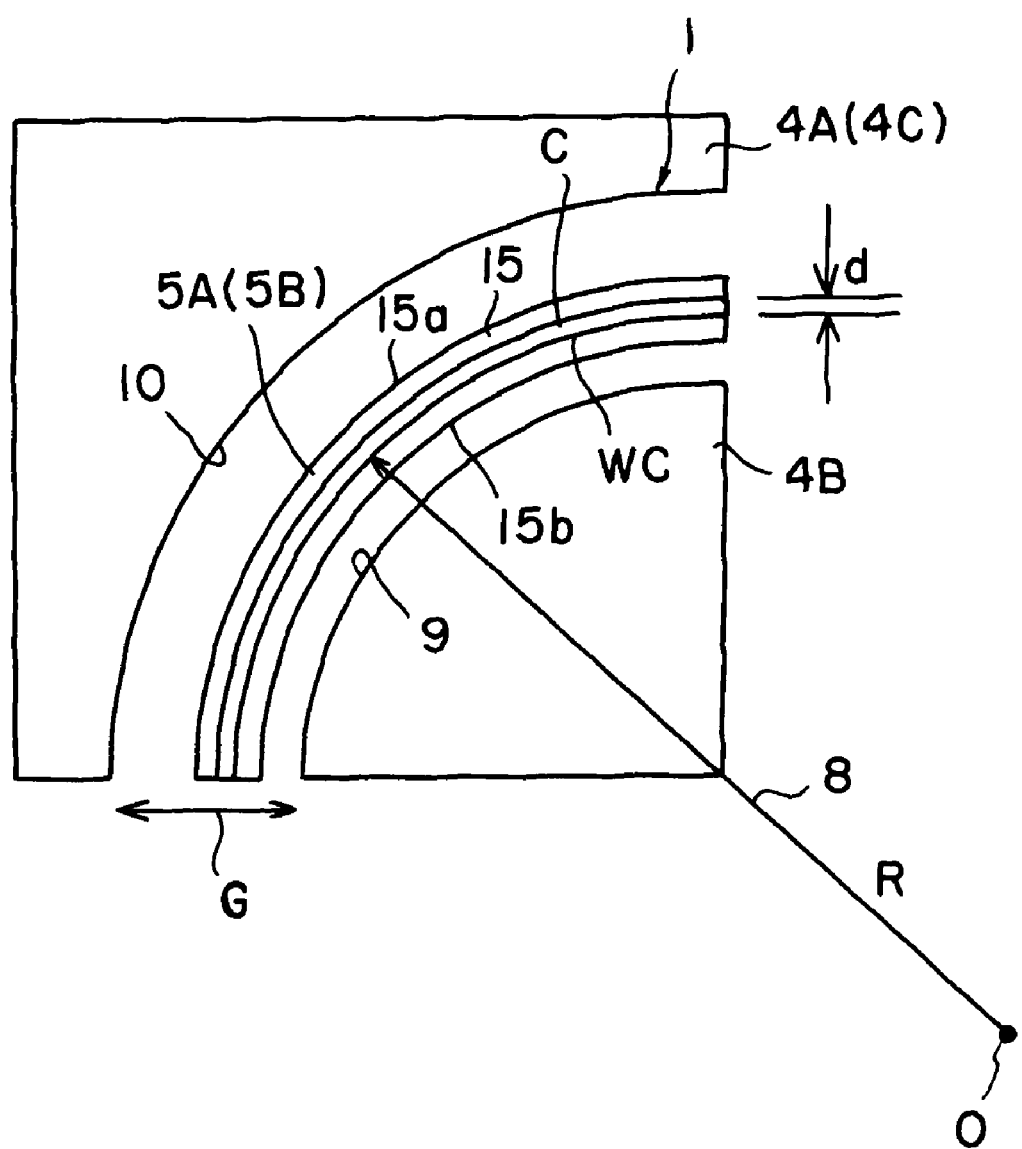
FIG. 1 is a plan view showing an embodiment of the present invention.
Figure 2:
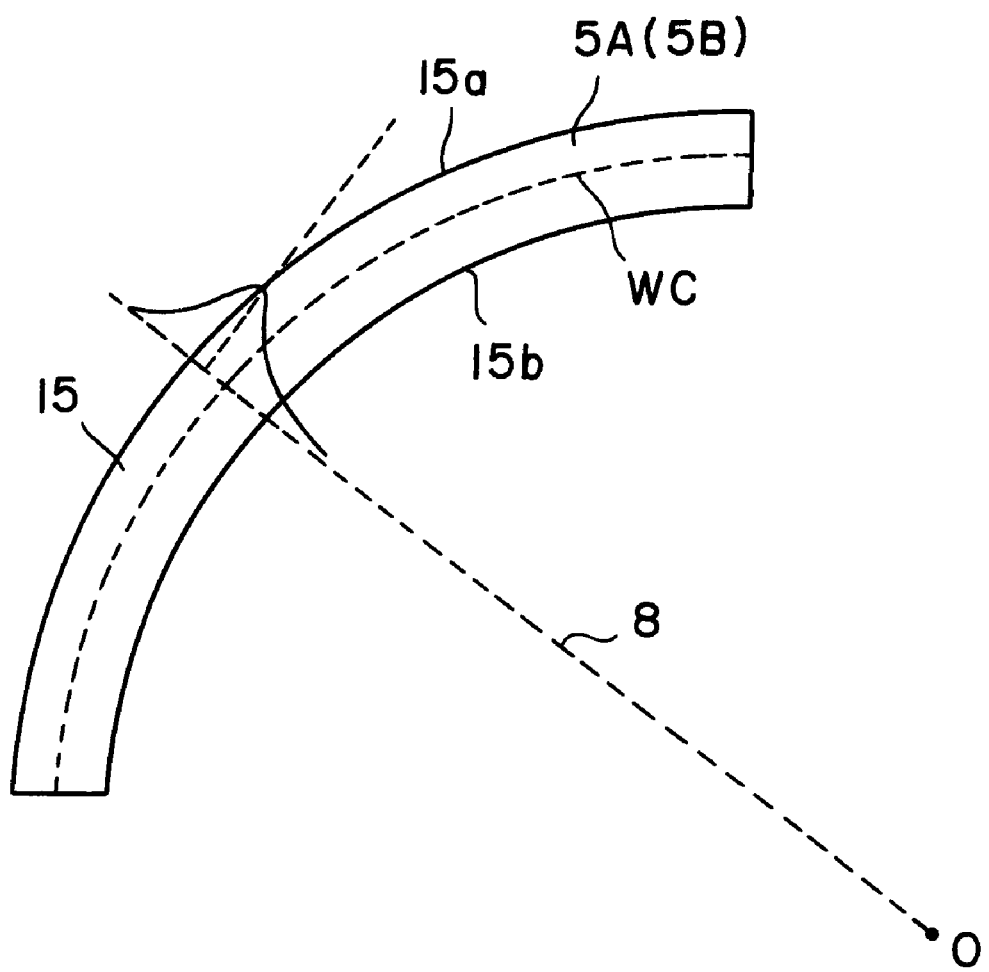
FIG. 2 is a diagram schematically illustrating optical intensity distribution in a curved part.

The curved optical waveguide 15 shown in FIG. 1 was used. The optical waveguide is made by titanium diffusion with a line width of titanium of 6 μm. The radius R of curvature of the curved optical waveguide was made 30 mm. The width G of the electrode gap 1 was made 13 μm. The materials of the electrodes 4A and 4B were Au and the material of the substrate was lithium niobate single crystal.

The center line WC of the optical waveguide was provided so as to overlap the center line C of the gap. The offset amount d was 0. As a result, the propagation loss per an unit length was proved to be 0.5 dB/cm when light of an output power of 1 mW was made incident into the optical waveguide.

In addition to these, the offset amount d was made 3 μm. As a result, the propagation loss per an unit length was lowered to 0.1 dB/cm.

Experiment 2

The fabrication and evaluation were performed for further evaluating the effects of the present invention. The optical modulator having the structure shown in FIGS. 4 and 5 was produced. The optical waveguide substrate 3 was made of lithium niobate single crystal, had a dimension of 3 inch and a thickness of 1 mm.

An optical waveguide of Mach-Zehnder type was formed on the substrate surface by titanium diffusion process and photolithography. The planar shape of the optical waveguide was shown in FIG. 4. The line width of titanium was made 3.6 μm in the incident part 11 and emitting part 12 and 8 μm in the curved region F and optical modulation region E. The shape of the optical waveguide in the curved region F was shown in FIG. 3. The titanium line patterns were subjected to thermal diffusion at 1031° C. to produce the optical waveguide.

Next, the ground electrodes 4A and 4C and signal electrode 4B were formed by plating. The size of the electrode gap was made 25 μm in the optical modulation region E. The radiuses RA and RB of curvature of the curved parts 15A and 15B were made 20 mm, respectively.

The lithium niobate substrate was then subjected to thinning. First, wax was applied onto the main face with the titanium pattern of the lithium niobate substrate, which was then adhered onto a dummy substrate (a thickness of 1 mm). At this stage, the back face of the substrate with the titanium pattern was ground for the thinning to a thickness of 7 μm. Further, a reinforcing lithium niobate substrate 31 was adhered onto the back face of the processed substrate with the titanium pattern through a sheet resin 30 having a thickness of about 50 μm, and then the dummy substrate was removed. Finally, the adhered body wad subjected to cutting and end face polishing to obtain chips.

An optical fiber was connected to the chip to evaluate the optical insertion loss. A polarization-maintaining fiber and a single-mode fiber were connected to the input and output sides of the chip, respectively, with an adhesive. The electrodes were probed for the application of a voltage.

According to a comparative example, the widths GA and GB of the gaps 1A and 1B in the respective curved regions F were made 13 μm. Further, the center line WC of the optical waveguide was formed so as to overlap the center line C of the gap. The offset amount d was 0. Light having an output power of 1 mW was made incident into the optical waveguide to obtain a propagation loss per an unit length of 0.5 dB/cm.

According to Example 1, the sizes GA and GB of the gaps 1A and 1B in the respective curved regions F were made 13 µm. Further, the offset amount d was made 3 µm. Light having an output power of 1 mW was made incident into the optical waveguide to obtain a propagation loss per an unit length of 0.1 dB/cm.

According to Example 2, the sizes GA and GB of the gaps 1A and 1B in the respective curved regions F were made 13 µm. Further, the offset amount d was made 3 µm. Light having an output power of 1 mW was made incident into the optical waveguide to obtain a propagation loss per an unit length of 0.1 dB/cm.

Although the foregoing description has been made on particular embodiments of the present invention, the invention is not limited thereto and various changes and modification may be made without departing from the spirit and scope of the appended claims.

The Invention claimed is:

1. An optical waveguide device comprising a substrate, at least a pair of directly opposed electrodes provided on a main face of the substrate, and a channel-type optical waveguide formed in a gap between the two directly opposed electrodes,
    wherein said optical waveguide comprises a curved part positioned entirely within said gap, and
    wherein only in the curved part, between the two directly opposed electrodes is a central line of said gap provided entirely outside of a center line of said optical waveguide with respect to a center of curvature of the curved part.

2. The optical waveguide device of claim 1, wherein the pair of the electrodes comprises a signal electrode and a ground electrode for modulating light propagating in the optical waveguide.

3. The optical waveguide device of claim 1, wherein said optical waveguide comprises a Mach-Zehnder type optical waveguide.

4. The optical waveguide device of claim 1, wherein the center line of said optical waveguide is distant from the center line of said gap by 0.1 µm or more.

5. The optical waveguide device of claim 1, wherein the center line of said optical waveguide is distant from the center line of said gap by 5 µm or less.

6. The optical waveguide device of claim 1, wherein said optical waveguide has a plurality of said curved parts and an inflection point between said adjacent curved parts.

7. The optical waveguide device of claim 1, wherein said electrode comprises a DC biasing electrode.

8. The optical waveguide device of claim 1, wherein said electrode comprises a phase adjusting electrode.

9. The optical waveguide device of claim 1, wherein said substrate comprises an X-cut lithium niobate substrate.

10. The optical waveguide device of claim 1, wherein said substrate has a thickness of 20 µm or smaller.

11. The optical waveguide device of claim 1, wherein said electrode is formed directly on said substrate without providing a buffer layer between them.

12. An optical waveguide device comprising a substrate, at least a pair of directly opposed electrodes provided on a main face of the substrate, and a channel-type optical waveguide formed in a gap between two opposing edges of the directly opposed electrodes,
    wherein said optical waveguide comprises a curved part positioned entirely within said gap, and
    wherein only in the curved part, between the opposing edges of the directly opposed electrodes is a central line of said gap provided entirely outside of a center line of said optical waveguide with respect to a center of curvature of the curved part, and
    wherein the center line of said optical waveguide is distant from the center line of said gap by 0.1 µm or more and 5 µm or less.

13. The optical waveguide device of claim 12, wherein the pair of the electrodes comprises a signal electrode and a ground electrode for modulating light propagating in the optical waveguide.

14. The optical waveguide device of claim 12, wherein said optical waveguide comprises a Mach-Zehnder type optical waveguide.

15. The optical waveguide device of claim 12, wherein said optical waveguide has a plurality of said curved parts and an inflection point between said adjacent curved parts.

16. The optical waveguide device of claim 12, wherein said electrode comprises a DC biasing electrode.

17. The optical waveguide device of claim 12, wherein said electrode comprises a phase adjusting electrode.

18. The optical waveguide device of claim 12, wherein said substrate comprises an X-cut lithium niobate substrate.

19. The optical waveguide device of claim 12, wherein said substrate has a thickness of 20 µm or smaller.

20. The optical waveguide device of claim 12, wherein said electrode is formed directly on said substrate without providing a buffer layer between them.

21. The optical waveguide device of claim 12, wherein the entirety of said optical waveguide is positioned between the opposing edges of the directly opposed electrodes.

* * * * *